United States Patent
Koba et al.

(10) Patent No.: US 11,909,249 B2
(45) Date of Patent: Feb. 20, 2024

(54) POWER FEEDING SYSTEM

(71) Applicant: PRIMEARTH EV ENERGY CO., LTD., Shizuoka (JP)

(72) Inventors: Daisuke Koba, Toyohashi (JP); Yuji Torii, Toyohashi (JP); Yuji Sakayanagi, Toyohashi (JP); Yasushi Matsukawa, Toyohashi (JP)

(73) Assignee: PRIMEARTH EV ENERGY CO., LTD., Shizuoka (JP)

( * ) Notice: Subject to any disclaimer, the term of this patent is extended or adjusted under 35 U.S.C. 154(b) by 0 days.

(21) Appl. No.: 17/455,382

(22) Filed: Nov. 17, 2021

(65) Prior Publication Data

US 2022/0158473 A1 May 19, 2022

(30) Foreign Application Priority Data

Nov. 18, 2020 (JP) .................................. 2020-191384
Aug. 30, 2021 (JP) .................................. 2021-139513

(51) Int. Cl.

| | | |
|---|---|---|
| *H02J 7/14* | (2006.01) | |
| *H02J 7/00* | (2006.01) | |
| *B60L 8/00* | (2006.01) | |
| *H02S 10/20* | (2014.01) | |
| *B60K 16/00* | (2020.01) | |
| *H02J 1/00* | (2006.01) | |

(52) U.S. Cl.
CPC .................. *H02J 7/14* (2013.01); *B60K 16/00* (2013.01); *B60L 8/003* (2013.01); *H02J 1/00* (2013.01);
(Continued)

(58) Field of Classification Search
CPC ........ H02J 7/14; H02J 1/00; H02J 3/38; H02J 2300/24; H02J 7/02; H02J 7/34;
(Continued)

(56) References Cited

U.S. PATENT DOCUMENTS

| | | | | |
|---|---|---|---|---|
| 6,380,715 B1 * | 4/2002 | Kubo | ..................... | H01M 10/44 |
| | | | | 320/128 |
| 2006/0061922 A1 * | 3/2006 | Mihai | ....................... | H02J 7/34 |
| | | | | 361/20 |

(Continued)

FOREIGN PATENT DOCUMENTS

| | | |
|---|---|---|
| EP | 2587582 A2 | 5/2013 |
| JP | 2015015855 A | 1/2015 |

(Continued)

OTHER PUBLICATIONS

European Patent Office, Extended European Search Report Issued in Application No. 21205741.8, dated Mar. 30, 2022, Germany, 7 pages.
(Continued)

*Primary Examiner* — Lincoln D Donovan
*Assistant Examiner* — Alex W Lam
(74) *Attorney, Agent, or Firm* — McCoy Russell LLP

(57) ABSTRACT

A power feeding system of the present disclosure includes a control unit. In a case where a magnitude of supply destination power is smaller than an upper limit value of the power supply capability of the power source, the control unit controls the charge/discharge control circuit so as to meet the supply destination power based on power output from the power source, and to charge the storage battery with power which is a difference obtained by subtracting the supply destination power from the upper limit value of the power supply capability of the power source. In a case where the magnitude of the supply destination power is more than or equal to the upper limit value of the power supply capability of the power source, the control unit controls the charge/discharge control circuit so as to meet the supply destination power by both the power source and the storage battery.

7 Claims, 8 Drawing Sheets

(52) U.S. Cl.
CPC .......... *H02J 7/0031* (2013.01); *H02S 10/20* (2014.12); *B60K 2016/003* (2013.01)

(58) Field of Classification Search
CPC .. H02J 3/322; H02J 3/32; B60K 16/00; B60K 2016/003; B60L 8/003; B60L 1/04; B60L 50/10; B60L 2210/40; H02S 10/20; Y02E 70/30; Y02E 10/56; Y02T 10/7072
See application file for complete search history.

(56) References Cited

U.S. PATENT DOCUMENTS

| | | | |
|---|---|---|---|
| 2013/0187465 A1* | 7/2013 | Abe | H02J 1/14 307/52 |
| 2020/0122585 A1* | 4/2020 | Bhat | G05B 19/0426 |
| 2021/0013734 A1 | 1/2021 | Shirasaki | |

FOREIGN PATENT DOCUMENTS

| | | |
|---|---|---|
| JP | 2018098953 A | 6/2018 |
| JP | 2019068667 A | 4/2019 |
| JP | 6671575 B1 | 3/2020 |
| JP | 2020102916 A | 7/2020 |
| WO | 2020105019 A2 | 5/2020 |
| WO | 2020186363 A1 | 9/2020 |

OTHER PUBLICATIONS

Japanese Patent Office, Office Action Issued in Application No. 2021-139513, dated Nov. 28, 2023, 5 pages. (Submitted with Machine Translation).

* cited by examiner

ALLOCATION OF REMAINING AMOUNT OF POWER GENERATED
BY GENERATOR AT NORMAL TEMPERATURE
(UPPER LIMIT OF POWER GENERATION CAPABILITY − POWER DEMAND AMOUNT)
TO STORAGE BATTERY

| AT NORMAL TEMPERATURE | | STORAGE BATTERY SOC | | | | | | | | | |
|---|---|---|---|---|---|---|---|---|---|---|---|
| | | 10 | 20 | 30 | 40 | 50 | 60 | 70 | 80 | 90 | 100 |
| POWER DEMAND AMOUNT | <1000W | 100 | 100 | 100 | 100 | 100 | 80 | 60 | 40 | 20 | 0 |
| | <1500W | 100 | 100 | 100 | 100 | 80 | 60 | 40 | 20 | 0 | 0 |
| | <3000W | 0 | 0 | 0 | 0 | 0 | 0 | 0 | 0 | 0 | 0 |

Fig. 3

ALLOCATION OF REMAINING AMOUNT OF POWER GENERATED
BY GENERATOR AT HIGH TEMPERATURE
(UPPER LIMIT OF POWER GENERATION CAPABILITY − POWER DEMAND AMOUNT)
TO STORAGE BATTERY

| AT HIGH TEMPERATURE | | STORAGE BATTERY SOC | | | | | | | | | |
|---|---|---|---|---|---|---|---|---|---|---|---|
| | | 10 | 20 | 30 | 40 | 50 | 60 | 70 | 80 | 90 | 100 |
| POWER DEMAND AMOUNT | <1000W | 100 | 100 | 100 | 80 | 60 | 40 | 20 | 0 | 0 | 0 |
| | <1500W | 100 | 100 | 80 | 60 | 40 | 20 | 0 | 0 | 0 | 0 |
| | <3000W | 0 | 0 | 0 | 0 | 0 | 0 | 0 | 0 | 0 | 0 |

Fig. 4

ALLOCATION OF REMAINING AMOUNT OF POWER GENERATED
BY GENERATOR AT NORMAL TEMPERATURE
(UPPER LIMIT OF POWER GENERATION CAPABILITY - POWER DEMAND AMOUNT)
TO STORAGE BATTERY

| AT NORMAL TEMPERATURE | | STORAGE BATTERY SOC | | | | | | | | | |
|---|---|---|---|---|---|---|---|---|---|---|---|
| | | 10 | 20 | 30 | 40 | 50 | 60 | 70 | 80 | 90 | 100 |
| POWER DEMAND AMOUNT | <1000W | 100 | 100 | 100 | 100 | 80 | 60 | 40 | 20 | 0 | 0 |
| | <1500W | 100 | 100 | 100 | 100 | 100 | 80 | 60 | 40 | 20 | 0 |
| | <3000W | 0 | 0 | 0 | 0 | 0 | 0 | 0 | 0 | 0 | 0 |

Fig. 5

POWER FEEDING SYSTEM

CROSS-REFERENCE TO RELATED APPLICATIONS

This application claims priority to Japanese Patent Application No. 2020-191384, filed on Nov. 18, 2020, and Japanese Patent Application No. 2021-139513, filed on Aug. 30, 2021. The entire contents of the above-listed applications are hereby incorporated by reference for all purposes.

TECHNICAL FIELD

The present disclosure relates to, for example, a power feeding system including a storage battery and a generator that can supply power to a power supply destination such as a house.

BACKGROUND

In recent years, a storage battery for household use has become widely used from increased environmental awareness or increased disaster prevention awareness. However, there is a problem in that the capacity of a storage battery for household use installed at a house is small for meeting a power demand when a power outage occurs for several days at the time of a disaster. In addition, installing a generator is conceivable as another method of supplying power to a house. The generator can permanently supply power if fuel can be kept. Thus, an example of a power feeding system in which an electric vehicle is utilized as a portable storage battery, and a travel-purpose storage battery for the electric vehicle and a stationary storage battery are connected in parallel is disclosed in Japanese Unexamined Patent Application Publication No. 2020-102916.

The power supply system described in Japanese Unexamined Patent Application Publication No. 2020-102916 includes a stationary storage battery that is provided at a communication business establishment and discharges power to a load, an electric vehicle including a travel-purpose storage battery for moving, and a DC interconnected recharger/discharger that, when the electric vehicle returns to the communication business establishment, connects the travel-purpose storage battery to the stationary storage battery in parallel. When the stationary storage battery discharges power to the load, the travel-purpose storage battery is discharged via the recharger/discharger.

SUMMARY

With the technology described in Japanese Unexamined Patent Application Publication No. 2020-102916, a utilization time is made longer by connecting the electric vehicle than when only the stationary storage battery is used, but in a case where the electric vehicle moves away, the operation is performed only with the stationary storage battery. Thus, there is a problem in that the utilization time cannot be significantly extended even if the technology described in Japanese Unexamined Patent Application Publication No. 2020-102916 is utilized.

The present disclosure was made in view of the above circumstances, and has an object to provide a power feeding system that can supply power for a long period with a limited-size storage battery included.

In one example aspect, a power feeding system includes a storage battery configured to be rechargeable and dischargeable, and to output power at a storage battery output voltage, a charge/discharge control circuit configured to control charging/discharging power to/from the storage battery, a power source at least having a power supply capability, and a control unit configured to control an operation of the charge/discharge control circuit, wherein in a case where a magnitude of supply destination power which is consumption power at a power supply destination to be supplied with power by the power source is lower than an upper limit value of the power supply capability of the power source, the control unit controls the charge/discharge control circuit so as to meet the supply destination power based on power output from the power source and to charge the storage battery with power which is a difference obtained by subtracting the supply destination power from the upper limit value of the power supply capability of the power source, and in a case where the magnitude of the supply destination power is more than or equal to the upper limit value of the power supply capability of the power source, the control unit controls the charge/discharge control circuit so as to meet the supply destination power by both the power source and the storage battery.

The power feeding system of the present disclosure charges the storage battery when the power generation capability of the power generation device exceeds a power demand at the supply destination, and supplies power using both the storage battery and the power generation device when the power generation capability of the power generation device falls below the power demand at the supply destination.

According to the power feeding system of the present disclosure, a power feeding system that can supply power for a long period with a limited-size storage battery included can be achieved.

The above and other objects or features of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 3 is a table describing an example of an operation of the power feeding system according to the second embodiment.

FIG. 4 is a table describing another example of an operation of the power feeding system according to the second embodiment.

FIG. 5 is a table describing another example of the operation of the power feeding system according to the second embodiment.

DETAILED DESCRIPTION

Figure 1:
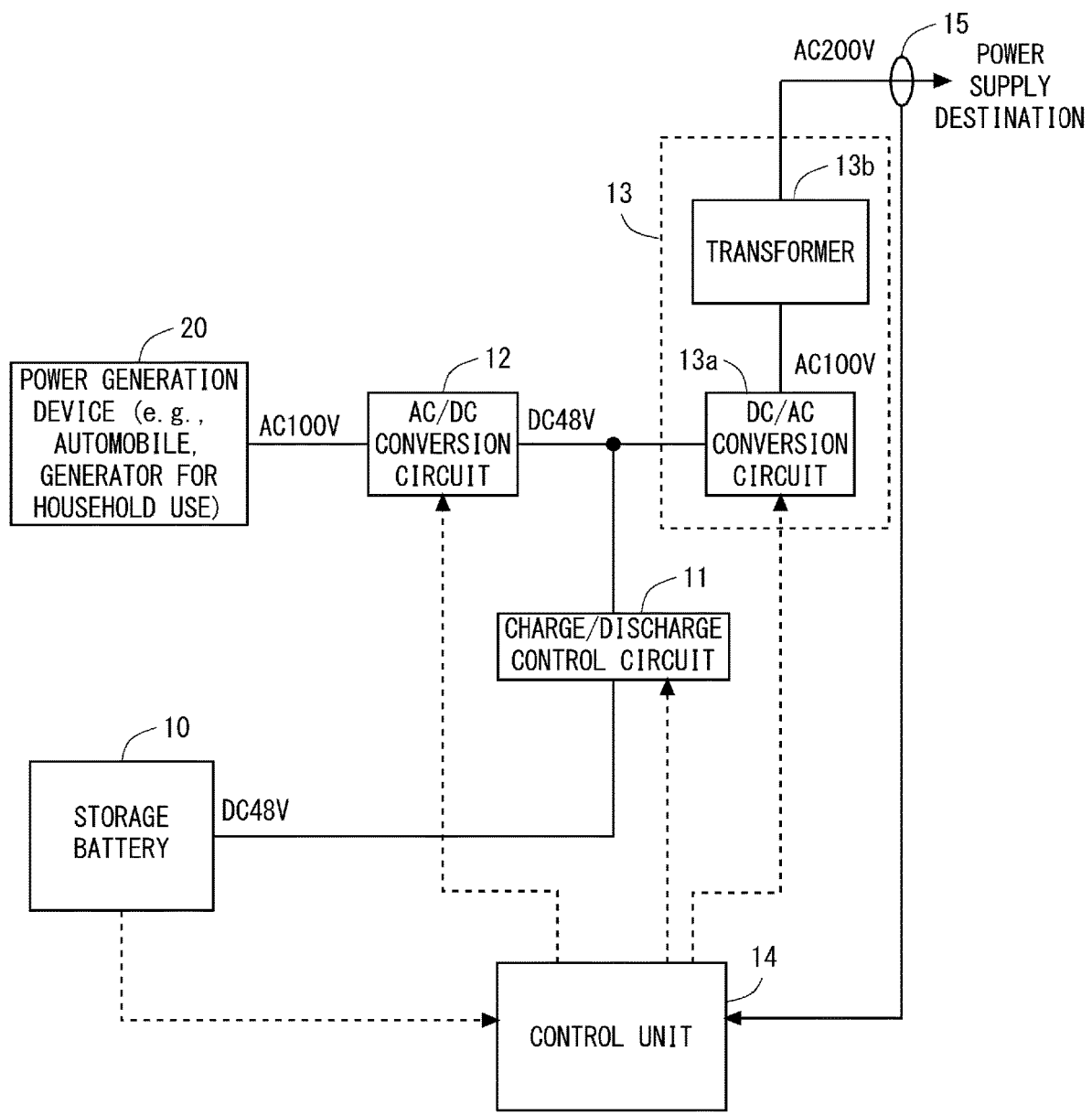
FIG. 1 is a block diagram of a power feeding system according to a first embodiment.

For clarifying the explanation, the following descriptions and the drawings may be partially omitted and simplified as appropriate. Further, each of the elements that are shown in the drawings as functional blocks for performing various processes can be implemented by hardware such as a CPU, a memory, and other types of circuits, or implemented by software such as a program loaded in a memory. Therefore, those skilled in the art will understand that these functional blocks can be implemented solely by hardware, solely by software, or a combination thereof. That is, they are limited to neither hardware nor software. Note that the same symbols are assigned to the same components throughout the drawings and duplicated explanations are omitted as required.

Further, the above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

First Embodiment

FIG. 1 shows a block diagram of a power feeding system 1 according to a first embodiment. As shown in FIG. 1, the power feeding system 1 includes a storage battery 10, a charge/discharge control circuit 11, a first conversion circuit (for example, an AC/DC conversion circuit 12), a second conversion circuit (for example, a power conversion circuit 13), a control unit 14, and a power measuring unit 15.

Moreover, a power source at least having a power supply capability is connected to the power feeding system 1. A power generation device 20 that only performs power generation and output as a power source is connected to the power feeding system 1 according to the first embodiment. The power generation device 20 includes any one of a solar panel, a hybrid vehicle to which fuel that is usable for power generation can be added, a generator, and a storage battery (for example, a fuel cell) that chemically retains/discharges electric energy, for example. Note that although a rechargeable/dischargeable storage battery can be utilized as a power source, an example in which the storage battery is utilized will be described in another embodiment. The first embodiment will describe an example in which a generator that has a maximum power generation capability of approximately 1500 W and outputs 100-V AC power, for example, is used as the power generation device 20. In a case of utilizing an automobile as the power generation device 20, a 100-V AC power outlet of the automobile can be used. Moreover, a power source of the automobile and a generator for household use can output 100-V AC power with the maximum power generation capability of approximately 1500 W as typical specifications.

Herein, what is called a hybrid vehicle or a fuel cell vehicle in which "an internal combustion engine through use of gasoline, hydrogen, or the like" and "a storage battery" are used as drive sources is preferable as the automobile. Although an electric vehicle that does not use gasoline or the like is also conceivable as an automobile in which a "storage battery" is used as a drive source, the maximum power generation capability (a capacity of the storage battery) is inevitably small merely with the storage battery mounted on the electric vehicle. On the other hand, the hybrid vehicle or the like can generate electricity from gasoline or hydrogen, and thus, the maximum power generation capability can be increased. Even if it takes time until power is restored at the time of a power outage, power supply can be continued. Moreover, if gasoline can be fed, power can be supplied for a longer time.

In the power feeding system 1 according to the first embodiment, a typical house or a power grid line, for example, is assumed as a supply destination. In a case where the power supply destination is a house, 200-V AC high-voltage side supply destination power and 100-V AC low-voltage side supply destination power are supplied to the supply destination. In a case where the power supply destination is a power grid line, 200-V AC high-voltage side supply destination power and 100-V AC low-voltage side supply destination power are supplied in response to usage of the power grid line. Note that the power feeding system 1 according to the first embodiment can also be utilized as a power storage system for a power grid to be connected to the power grid.

The storage battery 10 is rechargeable/dischargeable, and outputs DC power at a storage battery output voltage. The storage battery output voltage is 48 V in the example shown in FIG. 1, but the storage battery output voltage is not required to be 48 V. For example, a battery which is a nickel metal hydride battery for a hybrid vehicle and enables 1000-W output in a normal-temperature region with one module (six cells), or the like can be utilized as the storage battery. Alternatively, a lithium-ion secondary battery can also be utilized as the storage battery. Since use of a high-power battery reduces the minimum unit of capacity, the system capacity can be adjusted little by little. This makes it easy to set power that can be output from the system at a bare minimum.

Moreover, the storage battery 10 can be configured by combining a plurality of batteries. The configuration in which the plurality of batteries are combined enables the system to be operated even in a case where some of the batteries break down. In particular, in a case where power supply from a power company stops, it is necessary to avoid the system breaking down to be brought into an inoperable state, and it is possible to connect the batteries in parallel, but even a series system can be used. Further, since replacement when a battery breaks down is easy by adopting a parallel circuit at a unit of a small number of batteries, a rebuilt battery or the like used in the market can be utilized to perform repair or replacement or the like easily and inexpensively. Moreover, by adopting a parallel circuit, some of the batteries in the parallel circuit can also be taken out for use as a mobile battery. In that case, a nickel metal hydride battery and a lithium-ion secondary battery can also be included in the system in a mixed manner such as by using light-weight and compact lithium-ion secondary batteries suitable to be carried as a group of some portable batteries while using a large nickel metal hydride battery not suitable to be carried dedicatedly as a stationary storage battery.

The charge/discharge control circuit 11 controls charging/discharging power to/from the storage battery 10. More specifically, the charge/discharge control circuit 11 controls the magnitude of power for charging the storage battery 10 and the magnitude of power to be discharged from the storage battery 10 based on an instruction from the control unit 14 in conjunction with the AC/DC conversion circuit 12. Note that in the example shown in FIG. 1, the charge/discharge control circuit 11 does not perform voltage conversion, but the charge/discharge control circuit 11 may have a voltage conversion function.

The AC/DC conversion circuit 12, to which the power generation device 20 is connected, converts an AC generator output voltage output from the power generation device 20 into a DC storage battery output voltage. In the example shown in FIG. 1, the AC/DC conversion circuit 12 converts a 100-V AC voltage output from the power generation device 20 into a 48-V DC voltage to be the storage battery output voltage. The AC/DC conversion circuit 12 also adjusts the amount of power to be taken out of the power generation device 20 based on an instruction from the control unit 14.

The power conversion circuit 13 converts the storage battery output voltage (for example, the 48-V DC voltage) into AC supply destination power. In the example shown in FIG. 1, the power conversion circuit 13 outputs a 200-V AC voltage as a voltage after conversion to the power supply destination. Note that in a case where the power supply destination utilizes 100-V AC power, the 200-V AC voltage is converted into a 100-V AC voltage in a distribution board at the power supply destination.

The power conversion circuit 13 has a third conversion circuit (for example, a DC/AC conversion circuit 13*a*) and a fourth conversion circuit (for example, a transformer 13*b*). The DC/AC conversion circuit 13*a* converts the generator output voltage (48-V DC voltage) into AC low-voltage side supply destination power (100-V AC voltage). The transformer 13*b* further converts the low-voltage side supply destination power (100-V AC voltage) into AC high-voltage side supply destination power (200-V AC voltage). Then, in the power feeding system 1 according to the first embodiment, a power demand at the power supply destination is measured by the power measuring unit 15.

The control unit 14 can be implemented by, for example, an arithmetic logic unit such as a microcontroller unit (MCU) capable of executing a program, or a dedicated hardware. In a case of using the arithmetic logic unit capable of executing a program as this control unit 14, a power feeding control program that achieves an operation which will be described below by the program executed by the control unit 14 shall be incorporated into the control unit 14.

The control unit 14 controls operations of the charge/discharge control circuit 11, the AC/DC conversion circuit 12, and the power conversion circuit 13. Herein, the control unit 14 controls operations of the charge/discharge control circuit 11, the AC/DC conversion circuit 12, and the power conversion circuit 13 in accordance with a state of charge of the storage battery 10 and a power generation capability of the power generation device 20. More specifically, in a case where the magnitude of the supply destination power is lower than the upper limit value of the power generation capability of the power generation device 20, the control unit 14 controls the charge/discharge control circuit 11, the AC/DC conversion circuit 12, and the power conversion circuit 13 so as to meet the supply destination power based on power output from the power generation device 20. At this time, the control unit 14 further controls the charge/discharge control circuit 11, the AC/DC conversion circuit 12, and the power conversion circuit 13 so as to charge the storage battery 10 with power which is a difference obtained by subtracting the supply destination power from the upper limit value of the power generation capability of the power generation device 20. Alternatively, in a case where the magnitude of the supply destination power is more than or equal to the upper limit value of the power generation capability of the power generation device 20, the control unit 14 controls the charge/discharge control circuit 11, the AC/DC conversion circuit 12, and the power conversion circuit 13 so as to meet the supply destination power by both the power generation device 20 and the storage battery 10. Note that in the present embodiment, the upper limit value of the power generation device 20 is set at the upper limit value of the capability of the power generation device 20, but may be a control upper limit value.

Figure 2:
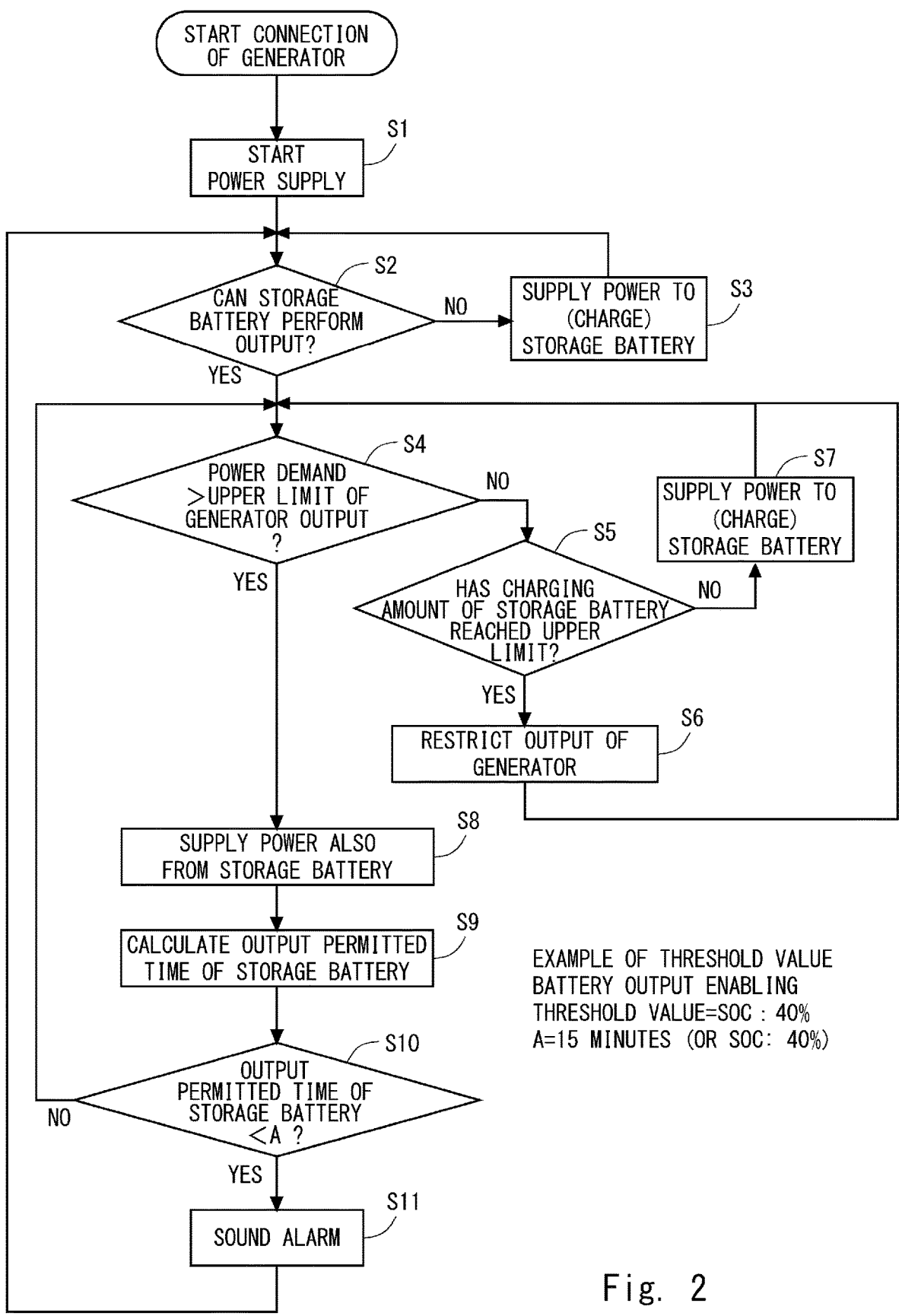
FIG. 2 is a flowchart describing the operation of the power feeding system according to the first embodiment.

Herein, an operation of the power feeding system 1 according to the first embodiment will be described. In the power feeding system 1 according to the first embodiment, although power can be supplied to a supply destination by the storage battery 10 alone, an operation when the power generation device 20 as one of features in the power feeding system 1 is connected will be described below. FIG. 2 shows a flowchart describing the operation of the power feeding system 1 according to the first embodiment. FIG. 2 describes the operation of the power feeding system 1 when the power generation device 20 is connected to the power feeding system 1.

As shown in FIG. 2, in the power feeding system 1, power supply from the power generation device 20 is started when the power generation device 20 is connected to the AC/DC conversion circuit 12 (step S1). Subsequently, in the power feeding system 1, the control unit 14 checks the state of charge of the storage battery 10 to determine whether the storage battery 10 can perform output (step S2). In this step S2, the control unit 14 determines that the storage battery cannot perform output if the state of charge (SOC) of the storage battery 10 is less than or equal to a preset storage battery output enabling threshold value (for example, 40%). On the other hand, if the state of charge of the storage battery 10 is higher than 40%, the control unit 14 determines that power can be supplied from the storage battery 10.

In a case where it is determined in this step S2 that power cannot be supplied from the storage battery 10 (NO in step S2), the charge/discharge control circuit 11, the AC/DC conversion circuit 12, and the power conversion circuit 13 are controlled so as to charge the storage battery 10 with power taken out of the power generation device 20 (step S3). In this step S3, charging of the storage battery 10 is performed to such a degree that the state of charge of the storage battery 10 reaches 50%, for example. This brings the determination in step S2 into the state where it is determined that power can be supplied from the storage battery 10 to the power supply destination.

On the other hand, in a case where it is determined in step S2 that power can be supplied from the storage battery 10 (YES in step S2), the control unit 14 determines whether the power demand at the power supply destination is smaller than the upper limit value of the output capability of the power generation device 20 (step S4). In a situation where it is determined in this step S4 that the power demand at the power supply destination is less than or equal to the upper limit value of the power generation capability of the power generation device 20 (NO in step S4), the control unit 14 in the power feeding system 1 controls the charge/discharge control circuit 11, the AC/DC conversion circuit 12, and the power conversion circuit 13 so as to perform charging until the storage battery 10 reaches an upper limit voltage (for example, a full charge) using the difference obtained by subtracting the power demand from the upper limit value of the power generation capability of the power generation device 20 (steps S4, S5, S7). After the storage battery 10 reaches a full charge, the control unit 14 stops charging of the storage battery 10, and reduces the power generation capability of the power generation device 20 to a degree that can meet the power demand at the power supply destination (steps S4, S5, S6).

Subsequently, in a situation where it is determined in step S4 that the power demand at the power supply destination is larger than the upper limit value of the power generation capability of the power generation device 20 (YES in step S4), the control unit 14 in the power feeding system 1 controls the charge/discharge control circuit 11, the AC/DC conversion circuit 12, and the power conversion circuit 13 to supply power to the power supply destination not only from the power generation device 20 but also from the storage battery 10 (step S8). At this time, the control unit 14 monitors the state of charge of the storage battery 10 to calculate an output permitted time of the storage battery 10 (step S9).

Then, in a case where the output permitted time of the storage battery 10 falls below a preset threshold value A (YES in step S10), the control unit 14 provides a user with a notice to request to reduce the power demand (step S11). Moreover, the power feeding system 1 performs the processing of step S2 after the notice in step S11. On the other hand, in a case where the output permitted time of the storage battery 10 is more than or equal to the preset threshold value A (NO in step S10), the control unit 14 performs processing again from the processing of step S4.

Herein, the threshold value A is set at a time sufficient for the user to perform an action of changing the power demand. For example, a time of approximately fifteen minutes is possible. Alternatively, the state of charge of the storage battery 10 can also be used as the threshold value A and a criterion value, rather than the time.

From the above description, the power feeding system 1 according to the first embodiment meets power to the power supply destination with power output from the power generation device 20 when the power generation device 20 is connected, and charges the storage battery 10 with a surplus, if any, in the power generation capability of the power generation device 20. The power feeding system 1 according to the first embodiment can thereby extend the time during which the storage battery 10 can supply power in a period in which the power generation device 20 is disconnected.

Moreover, in a case where the power demand at the power supply destination exceeds the upper limit of the power generation capability of the power generation device 20 to cause a shortfall, the power feeding system 1 according to the first embodiment can compensate for the shortfall by power output from the storage battery 10. In general, power of approximately 3000 W to 6000 W is required for consumption at home, and 1500 W as a typical specification of the generator is insufficient in some cases. However, the power feeding system 1 according to the first embodiment eliminates the need to restrict the power demand at the supply destination by meeting a power demand exceeding the power generation capability of the power generation device 20 by power output from the storage battery 10.

Second Embodiment

In a second embodiment, details of charging processing in the power feeding system 1 will be described. FIG. 3 shows a table describing an example of an operation of the power feeding system according to the second embodiment. In the power feeding system 1, the control unit 14 controls the charge/discharge control circuit 11 and the AC/DC conversion circuit 12 so as to change the power generation capability of an AC generator to be allocated to charging of the storage battery 10 based on the state of charge of the storage battery 10 and the magnitude of supply destination power.

The example shown in FIG. 3 is to describe power to be allocated to charging of the storage battery 10 by the control unit 14 when the storage battery 10 is placed at a temperature determined to be a normal temperature (for example, approximately 25° C.). The control unit 14 allocates surplus power obtained by subtracting a power demand amount from the upper limit value of the power generation capability of the power generation device 20 to charging of the storage battery 10, and changes this power to be allocated in accordance with the state of charge of the storage battery 10. This change in the ratio to be allocated is achieved by the control unit 14 controlling the charge/discharge control circuit 11.

In the example shown in FIG. 3, the control unit 14 does not perform charging of the storage battery 10 in a state where the power demand amount is higher than the upper limit value of power generation and power supply is insufficient only with power supply from the power generation device 20 (more than or equal to 1500 W and less than or equal to 3000 W in the present embodiment).

In a state where the power demand amount is lower than the upper limit value of power generation and there is enough power for power supply (more than or equal to 1000 W and less than 1500 W in the present embodiment), the control unit 14 allocates a surplus of power generated by the power generation device 20 to charging of the storage battery 10 in the following manner. When the state of charge of the storage battery 10 is less than 40%, the total amount of the surplus is allocated to charging of the storage battery 10. When the state of charge of the storage battery 10 is less than 50%, 80% of the surplus is allocated to charging of the storage battery 10, when the state of charge is less than 60%, 60% of the surplus is allocated, when the state of charge is less than 70%, 40% of the surplus is allocated, and when the state of charge is less than 80%, 20% of the surplus is allocated. In a case where the state of charge is more than or equal to 80%, charging through use of the surplus is not performed.

In a state where the power demand amount is lower than the upper limit value of power generation and there is significantly enough power for power supply (less than 1000 W in the present embodiment), the control unit 14 allocates a surplus of power generated by the power generation device 20 to charging of the storage battery 10 in the following manner. When the state of charge of the storage battery 10 is less than 50%, the total amount of the surplus is allocated to charging of the storage battery 10. When the state of charge of the storage battery 10 is less than 60%, 80% of the surplus is allocated to charging of the storage battery 10, when the state of charge is less than 70%, 60% of the surplus is allocated, when the state of charge is less than 70%, 20% of the surplus is allocated, and when the state of charge is less than 90%, 20% of the surplus is allocated. In a case where the state of charge is more than or equal to 90%, charging through use of the surplus is not performed.

The control unit 14 charges the storage battery 10 with surplus power based on a map different from the allocation map shown in FIG. 3 in accordance with an environmental temperature at a point where the storage battery 10 is placed. FIG. 4 shows a table describing another example of an operation of the power feeding system according to the second embodiment. An allocation map shown in FIG. 4 is to describe power to be allocated to charging of the storage battery 10 by the control unit 14 when the storage battery 10 is placed at a temperature determined as a high temperature (for example, approximately 40° C. or above).

In the example shown in FIG. 4, the control unit 14 does not perform charging of the storage battery 10 in a state where the power demand amount is higher than the upper limit value of power generation and power supply will be insufficient only with power supply from the power generation device 20 (more than or equal to 1500 W and less than or equal to 3000 W in the present embodiment).

In a state where the power demand amount is lower than the upper limit value of power generation and there is enough power for power supply (more than or equal to 1000 W and less than 1500 W in the present embodiment), the control unit 14 allocates a surplus of power generated by the power generation device 20 to charging of the storage battery 10 in the following manner. When the state of charge of the storage battery 10 is less than 20%, the total amount of the surplus is allocated to charging of the storage battery 10. When the state of charge of the storage battery 10 is less than 30%, 80% of the surplus is allocated to charging of the storage battery 10, when the state of charge is less than 40%, 60% of the surplus is allocated, when the state of charge is less than 50%, 40% of the surplus is allocated, and when the state of charge is less than 60%, 20% of the surplus is allocated. In a case where the state of charge is more than or equal to 60%, charging through use of the surplus is not performed.

In a state where the power demand amount is lower than the upper limit value of power generation and there is significantly enough power for power supply (less than 1000 W in the present embodiment), the control unit 14 allocates a surplus of power generated by the power generation device 20 to charging of the storage battery 10 in the following manner. When the state of charge of the storage battery 10 is less than 30%, the total amount of the surplus is allocated to charging of the storage battery 10. When the state of charge of the storage battery 10 is less than 40%, 80% of the surplus is allocated to charging of the storage battery 10, when the state of charge is less than 50%, 60% of the surplus is allocated, when the state of charge is less than 60%, 40% of the surplus is allocated, and when the state of charge is less than 70%, 20% of the surplus is allocated. In a case where the state of charge is more than or equal to 70%, charging through use of the surplus is not performed.

From the description according to the second embodiment, in a case where the charging amount of the storage battery 10 is sufficient, the control unit 14 allocates only part of surplus power to charging of the storage battery 10. In this manner, by charging the storage battery 10 using a surplus of the power generation capability of the power generation device 20, fuel consumption of the power generation device 20 can be reduced. Moreover, by charging the storage battery 10 using only part of surplus power, an abrupt change in power demand is easily dealt with. Further, in a case where the state of charge of the storage battery 10 is low, the total amount of the surplus can be allocated to charging of the storage battery 10 to promptly restore the state of charge of the storage battery 10 to a state in which power can be supplied from the storage battery 10.

Moreover, the control unit 14 changes the relation between the state of charge and the ratio of surplus power to be allocated to charging based on the temperature at the point where the storage battery 10 is placed. Since the charging efficiency of the storage battery 10 decreases as the temperature rises, charging power is reduced in a region where the state of charge is high. On the other hand, although description is omitted in the foregoing, the state of charge at which the necessity to allocate the total amount of surplus power to charging arises can also be made higher at a normal temperature. In this manner, by controlling charging based on a temperature property of power that can be output from the storage battery 10, a total output enabled time can be maximized while preventing degradation of the storage battery.

Herein, the charging/discharging property of the storage battery 10 has a characteristic that the charging current is small in a region where the state of charge is high. The allocation maps shown in FIG. 3 and FIG. 4 show examples of reducing charging of the storage battery 10 in which the state of charge is higher as surplus power that can be allocated to charging decreases, while another allocation map can be considered with the characteristic of the above-described storage battery 10 taken into consideration. FIG. 5 shows a table describing another example of the operation of the power feeding system according to the second embodiment.

The example shown in FIG. 5 is an allocation map when the temperature at the place where the power generation device 20 is installed is a normal temperature. In this example shown in FIG. 5, the storage battery 10 having a higher state of charge is charged as surplus power decreases. By using such an allocation map, fuel consumption of the storage battery 10 can be reduced at the same time while increasing the charging efficiency. Note that also for the example shown in FIG. 5, two maps may be used differently depending on the temperature, similarly to the examples shown in FIGS. 3 and 4.

Third Embodiment

Figure 6:
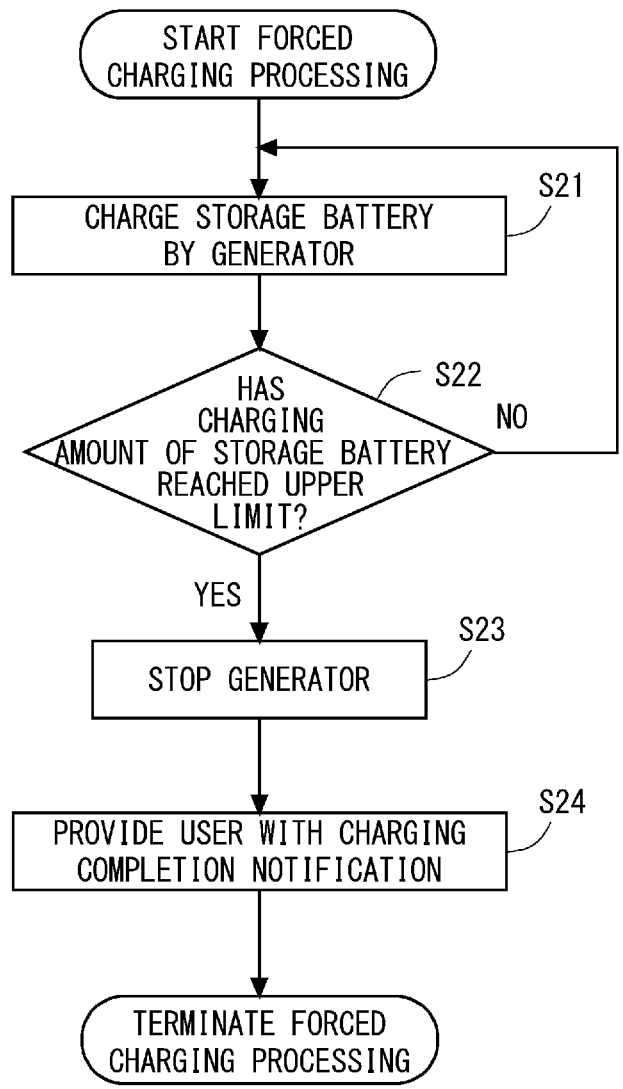
FIG. 6 is a flowchart describing an operation of the power feeding system according to the third embodiment.

In a third embodiment, an operation of the power feeding system 1 when fuel for operating the power generation device 20 is decreasing will be described. FIG. 6 shows a flowchart describing an operation of the power feeding system according to the third embodiment. FIG. 6 is to describe the operation of the power feeding system 1 in a case of disconnecting the generator from the power feeding system when the fuel amount of the power generation device 20 decreases. Note that in the example shown in FIG. 6, forced charging processing to be executed by a user performing a manipulation of providing a forced charging instruction for the power feeding system 1 when fuel of the power generation device 20 decreases shall be performed.

In the example shown in FIG. 6, first, the control unit 14 continues charging of the storage battery 10 by the power generation device 20 until the storage battery 10 reaches a full charge (steps S21, S22). Then, in response to the fact that the storage battery 10 has reached a full charge, the control unit 14 stops the power generation device 20 (step S23). Thereafter, in response to completion of charging of the storage battery 10, the control unit 14 provides the user with a charging completion notification (step S24).

From the above description, the power feeding system 1 according to the third embodiment enables the storage battery 10 to continue maximum supply even in the case of disconnecting the power generation device 20 from the power feeding system 1 for replenishing the power generation device 20 with fuel. In particular, in the case of utilizing an automobile as the power generation device 20, such previous charging of the storage battery 10 is important for not interrupting power supply.

Fourth Embodiment

Figure 7:
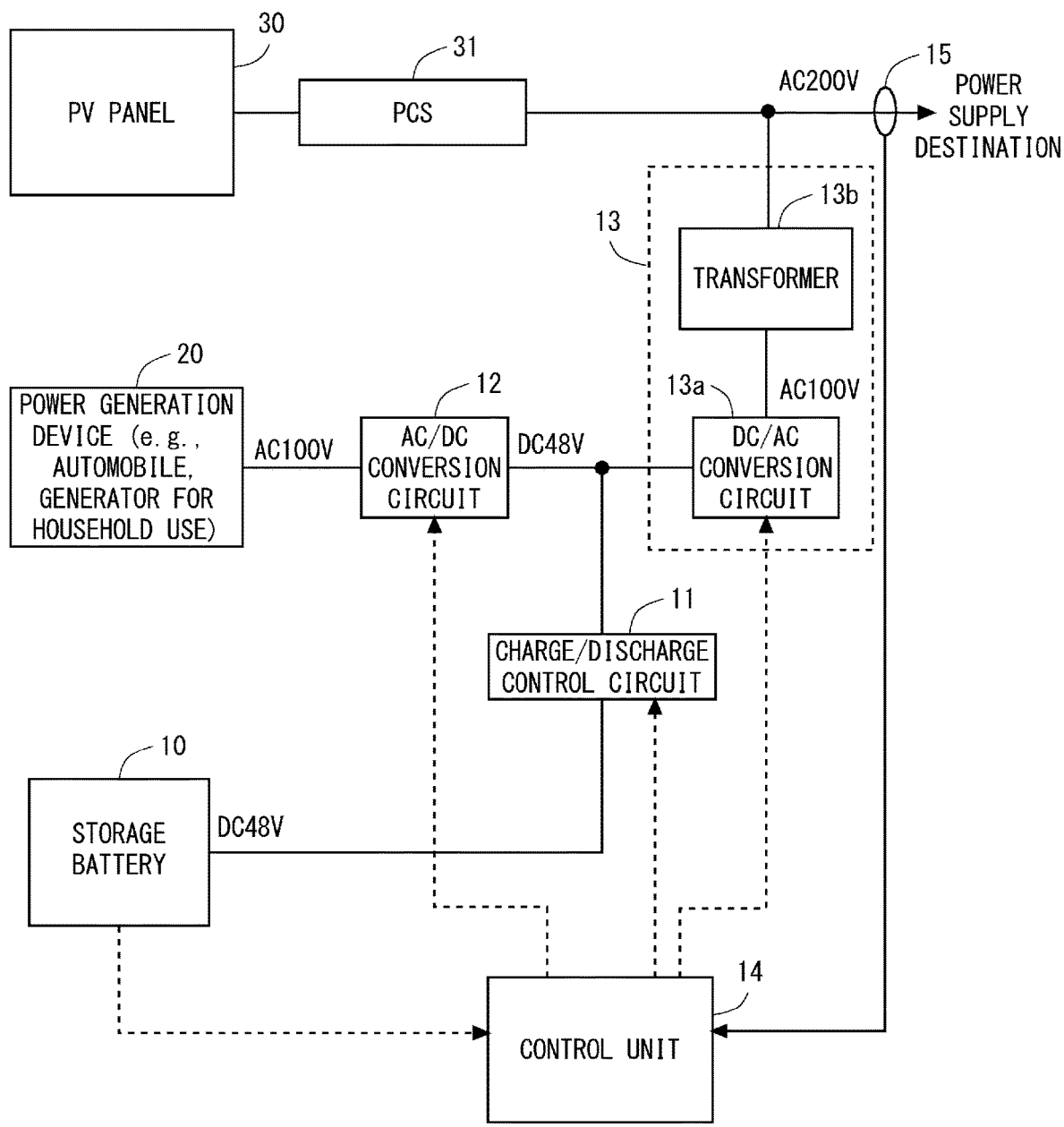
FIG. 7 is a block diagram of a power feeding system according to the fourth embodiment.

In a fourth embodiment, another mode of the power feeding system 1 described in the first embodiment will be described. FIG. 7 shows a block diagram of a power feeding system 2 according to the fourth embodiment. As shown in FIG. 7, the power feeding system 2 according to the fourth embodiment is obtained by adding a solar panel 30 and a power conditioner 31 to the power feeding system 1 according to the first embodiment.

The solar panel 30 is a power generation device that generates power using solar light. The power conditioner 31 converts a voltage of power generated by the solar panel 30 into a high-voltage side supply voltage to be supplied to a high-voltage power supply destination.

By providing the power feeding system 2 with the solar panel 30 and the power conditioner 31 in this manner, power can be generated not only by the power generation device 20, but also in another mode. This can further increase the power feeding capability of the power feeding system. Note that the storage battery 10 can also be charged with power generated by the solar panel 30 similarly to power generated by the power generation device 20.

Fifth Embodiment

When importance is attached to the magnitude of capacity of the storage battery 10 used in the power feeding system, a countermeasure such as increasing the number of parallel batteries should be taken in order to increase the followability to output variations, which results in increase in device size and cost. Thus, by combining storage batteries having different properties such as by replacing the power generation device 20 serving as a power source by a capacity-oriented storage battery 40 and combining an output-oriented storage battery as the storage battery 10, device size and cost are prevented from increasing while increasing the followability to output variations. In the fifth embodiment, an example of using the storage battery 40 as a power source will be described.

Figure 8:
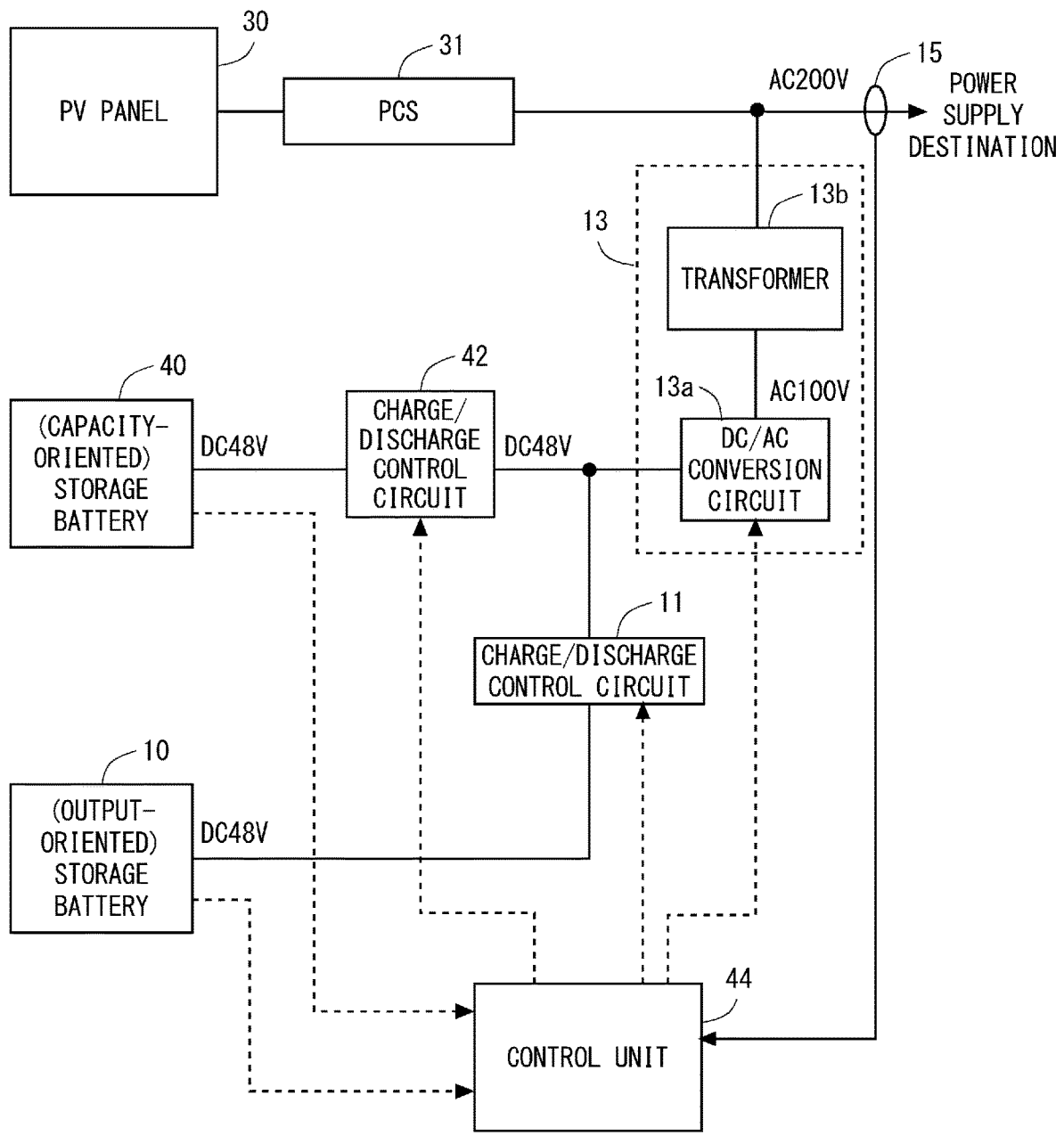
FIG. 8 is a block diagram of a power feeding system according to the fifth embodiment.

FIG. 8 shows a block diagram of a power feeding system 3 according to the fifth embodiment. As shown in FIG. 8, the power feeding system 3 according to the fifth embodiment includes the storage battery 40 instead of the power generation device 20, a charge/discharge control circuit 42 instead of the AC/DC conversion circuit 12, and a control unit 44 instead of the control unit 14. Moreover, in the power feeding system 3 according to the fifth embodiment, an output-oriented storage battery having high followability to abrupt variations in output power is used as the storage battery 10.

The storage battery 40 is, for example, a capacity-oriented storage battery having a large capacity with respect to the volume. The storage battery 40 has a characteristic of low followability to abrupt variations in output although the capacity is large, as compared with the storage battery 10 in performance. As the storage batteries 10, 40, a lithium-ion battery (ternary system—liquid system), a lithium-ion battery (iron phosphate system—liquid system), a lithium-ion battery (LTO system—liquid system), a nickel metal hydride battery, a lead storage battery, a Redox Flow (RF) battery, a NAS battery, or the like can be used. The NAS battery is a storage battery that repeats charging and discharging by means of a chemical reaction between sulfur and sodium ion using sodium (Na) for the negative electrode (minus electrode), sulfur (S) for the positive electrode (plus electrode), and fine ceramics for an electrolyte that separates both the electrodes. Batteries to be used as the storage battery 10 and the storage battery 40 are determined considering relative performance of batteries to be combined.

The charge/discharge control circuit 42 is a charge/discharge control circuit provided in correspondence to the storage battery 40, and controls charging of and discharging from the storage battery 40 in response to an instruction from the control unit 44. The control unit 44 changes the ratio between the magnitude of power to be taken out of the storage battery 10 and the magnitude of power to be taken out of the storage battery 40 in accordance with a varying speed of supply destination power and states of the storage battery 10 and the storage battery 40. Specifically, the control unit 44 determines power that can be output from the storage battery 40 from the states of the batteries such as the states of charge and the degree of degradation (such as output resistance) of the storage battery 10 and the storage battery 40, and controls the charge/discharge control circuit 11 and the charge/discharge control circuit 42 such that a difference between the magnitude of supply destination power and the amount of variations and the power that can be output from the storage battery 40 is compensated for by power output from the storage battery 10. The power feeding system 3 according to the fifth embodiment thereby deals with variations in supply destination power exceeding the output variation capability of the storage battery 40.

More specifically, the control unit 44 controls the charge/discharge control circuit 11 and the charge/discharge control circuit 42 so as to supply power to the supply destination mainly using the storage battery 40. In a case where it is estimated that a power variation speed at the supply destination exceeds the output variation capability of the storage battery 40, the control unit 44 provides a discharge instruction for the charge/discharge control circuit 11 so as to proactively perform power supply from the storage battery 10. Alternatively, in a case of detaching the storage battery 40, or in a case of proactively performing charging of the storage battery 40 from a grid power source or a solar panel, the control unit 44 provides the charge/discharge control circuit 11 and the charge/discharge control circuit 42 with an instruction that facilitates discharging from the storage battery 10.

The power feeding system 3 according to the fifth embodiment can prevent device size and cost from increasing while increasing the followability to output variations by combining storage batteries having different properties. Moreover, by considering the state of each battery in the control unit 44 to deal with a power demand, the storage battery can be used safely for a long period.

The first to fifth embodiments can be combined as desirable by one of ordinary skill in the art. From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion. For example, the present disclosure can be suitably utilized not only for household use, but also for a large-scale power feeding system for business use, power grid use, or the like.

The invention claimed is:

1. A power feeding system comprising:
a storage battery configured to be rechargeable and dischargeable, and to output power at a storage battery output voltage;

a charge/discharge control circuit configured to control charging/discharging power to/from the storage battery;

a power source at least having a power supply capability, wherein the power source includes a hybrid vehicle to which fuel that is usable for power generation can be added;

a control unit configured to control an operation of the charge/discharge control circuit; and a power conversion circuit configured to convert DC power supplied from the storage battery and the power source into AC power and output the AC power to a power supply destination, wherein in a case where a magnitude of supply destination power which is consumption power at the power supply destination to be supplied with power by the power source is lower than an upper limit value of the power supply capability of the power source, the power supply destination being a house or a power grid line, the control unit controls the charge/discharge control circuit so as to meet the supply destination power of the house or the power grid line based on power output from the power source and to charge the storage battery with power which is a difference obtained by subtracting the supply destination power from the upper limit value of the power supply capability of the power source, in a case where the magnitude of the supply destination power of the house or the power grid line is more than or equal to the upper limit value of the power supply capability of the power source, the control unit controls the charge/discharge control circuit so as to meet the supply destination power of the house or the power grid line by both the power source and the storage battery, and in a case where the power source is disconnected from the power feeding system for replenishing the power source with fuel, the control unit controls the charge/discharge control circuitry so as to continue a maximum power supply to the power supply destination when the power source is disconnected from the power feeding system, and the control unit controls the charge/discharge control circuitry responsive to a forced charging instruction from a user so as to force charging of the storage battery prior to disconnecting the power source from the power feeding system for replenishing the power source with fuel.

2. The power feeding system according to claim 1, wherein the control unit controls the charge/discharge control circuit so as to change the power supply capability of the power source to be allocated to charging of the storage battery based on a state of charge of the storage battery and the magnitude of the supply destination power.

3. The power feeding system according to claim 2, wherein the control unit controls the charge/discharge control circuit so as to further change the power supply capability of the power source to be allocated to charging of the storage battery based on an environmental temperature at a place where the storage battery is installed.

4. The power feeding system according to claim 1, wherein in a case where the forced charging instruction is provided from the user, the control unit controls the charge/discharge control circuit so as to perform charging until the storage battery reaches a full charge, and provides the user with a charging completion notification in response to completion of charging of the storage battery.

5. The power feeding system according to claim 1, further comprising a solar panel configured to supply the supply destination power.

6. The power feeding system according to claim 1, wherein the power source is a secondary battery configured to give priority to power storage capacity performance over the storage battery, and the control unit controls the charge/discharge control circuit so as to change a ratio between a magnitude of power to be taken out of the power source and a magnitude of power to be taken out of the storage battery in accordance with a varying speed of the supply destination power and states of the power source and the storage battery.

7. A power feeding system comprising:

a storage battery configured to be rechargeable and dischargeable, and to output power at a storage battery output voltage;

a charge/discharge control circuit configured to control charging/discharging power to/from the storage battery;

a power source at least having a power supply capability, wherein the power source includes a generator;

a power conversion circuit configured to convert DC power supplied from the storage battery and the power source into AC power and output the AC power to a power supply destination; and a control unit configured to control an operation of the charge/discharge control circuit, wherein in a case where a magnitude of supply destination power which is consumption power at the power supply destination to be supplied with power by the power source is lower than an upper limit value of the power supply capability of the power source, the power supply destination being a house or a power grid line, the control unit controls the charge/discharge control circuit so as to meet the supply destination power of the house or the power grid line based on power output from the power source and to charge the storage battery with power which is a difference obtained by subtracting the supply destination power from the upper limit value of the power supply capability of the power source, in a case where the magnitude of the supply destination power of the house or the power grid line is more than or equal to the upper limit value of the power supply capability of the power source, the control unit controls the charge/discharge control circuit so as to meet the supply destination power of the house or the power grid line by both the power source and the storage battery, and in a case where the power source is disconnected from the power feeding system for replenishing the power source with fuel, the control unit controls the charge/discharge control circuitry so as to continue a maximum power supply to the power supply destination when the power source is disconnected from the power feeding system, and the control unit controls the charge/discharge control circuitry responsive to a forced charging instruction from a user so as to force charging of the storage battery prior to disconnecting the power source from the power feeding system for replenishing the power source with fuel.

* * * * *